Aug. 29, 1933.        M. B. WHEELER        1,924,969
DEVICE FOR TESTING THE VISCOSITY OF LIQUIDS
Filed Jan. 20, 1931        2 Sheets-Sheet 1
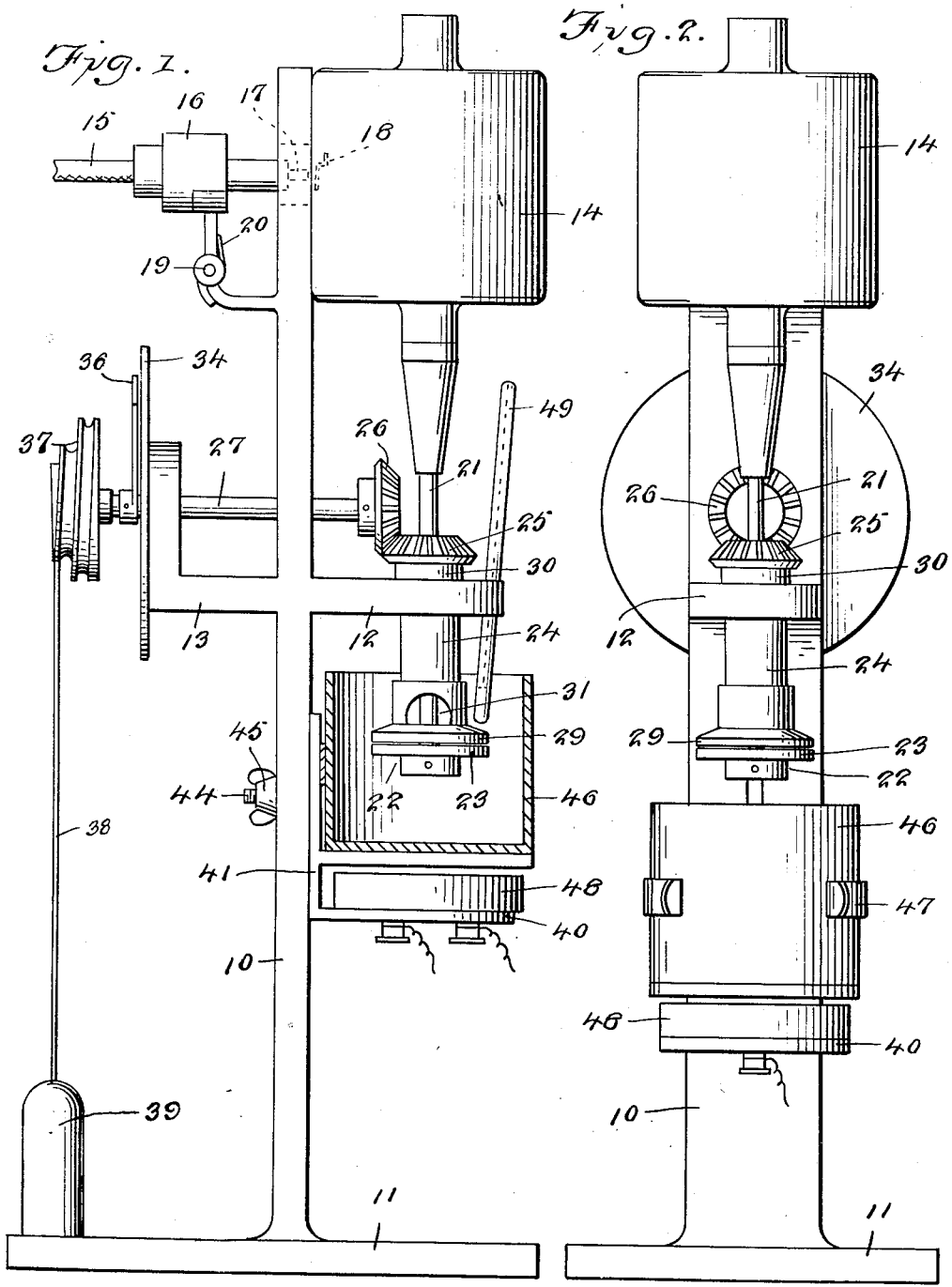
M. B. Wheeler INVENTOR
BY Victor J. Evans
and A. J. Evans ATTORNEYS

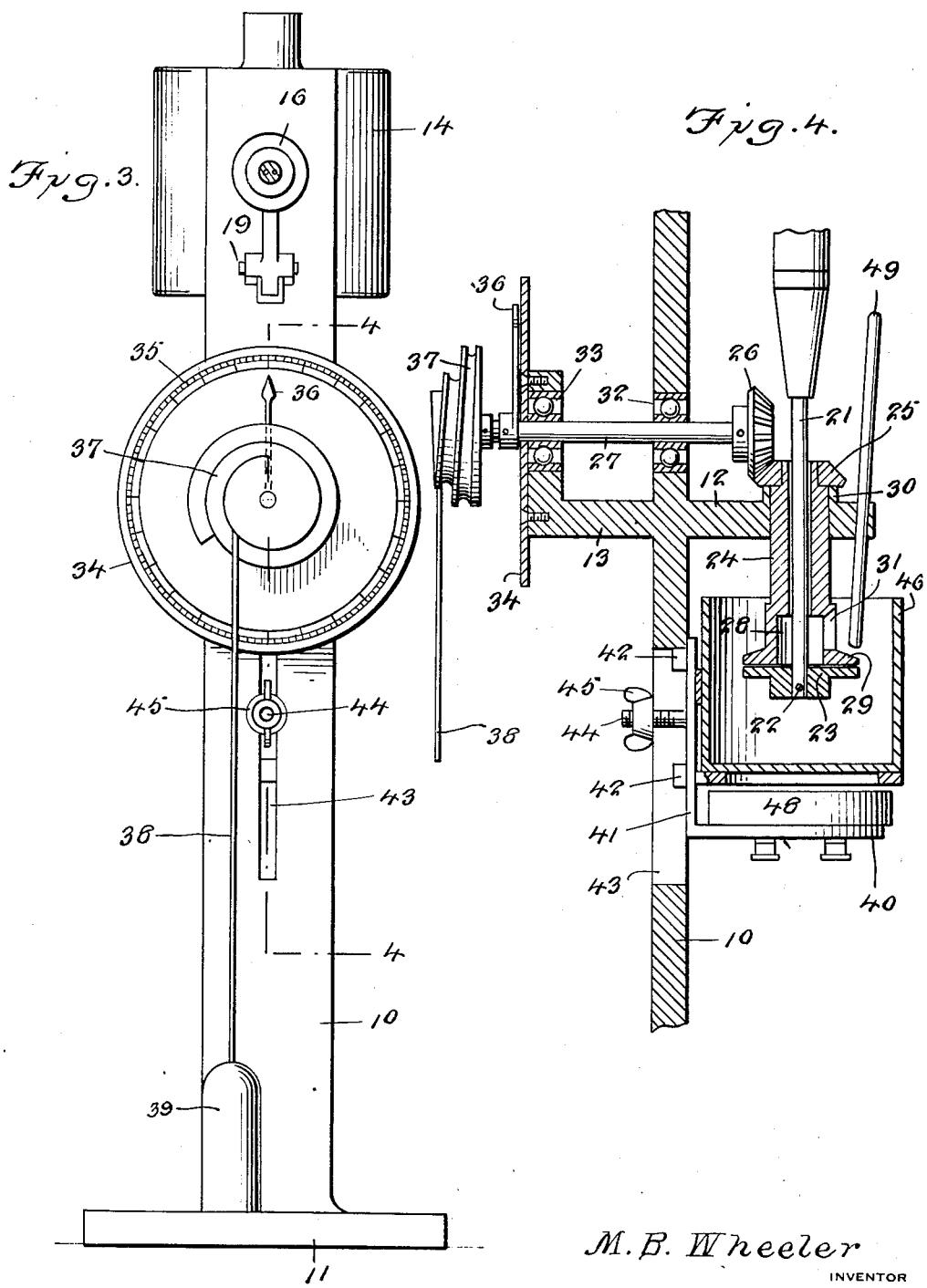

Patented Aug. 29, 1933

1,924,969

UNITED STATES PATENT OFFICE 1,924,969

DEVICE FOR TESTING THE VISCOSITY OF LIQUIDS

Marion B. Wheeler, Raleigh, N. C.

Application January 20, 1931. Serial No. 510,054

1 Claim. (Cl. 265—11)

This invention relates to liquid testing machines, an object being to provide a machine which while capable of testing liquids of various kinds, is especially adapted for testing oils.

Oils, and especially those used for lubricating purposes, should meet certain requirements as to viscosity, flash and fire. The most important requirement for lubricating oil is its ability to maintain surface tension, so as to set up and maintain a separating film between two relatively moving surfaces and thus reduce friction and wear.

The present invention has for its primary object the provision of a device by means of which the viscosity or surface tension of oils may be accurately determined under the same conditions to which the oils are subjected when in actual use, together with means whereby the results of these tests may be plainly read at any degree Fahrenheit.

With the above and other objects in view, the invention further includes the following novel features and details of construction, to be hereinafter more fully described, illustrated in the accompanying drawings and pointed out in the appended claim.

In the drawings:—

Figure 1 is a side elevation partly in section illustrating a liquid testing machine constructed in accordance with the invention.

Figure 2 is a rear elevation of the same.

Figure 3 is a front elevation.

Figure 4 is a fragmentary sectional view taken substantially on the line 4—4 of Figure 3.

In carrying out the invention, use is made of a driving member and a driven member, which are independently movable and held in close spaced relation, the said members being arranged to receive a supply of liquid between them so as to provide a coupling, together with means to indicate the surface tension of the liquid at various degrees Fahrenheit.

For this purpose, various means may be employed, one of which is shown in the accompanying drawings for the purpose of illustrating the invention. This consists in providing a frame which includes a post or a standard 10 which rises from a base 11 and which is provided with oppositely extending arms 12 and 13, while a motor 14 which will operate at any definite number of revolutions per minute, is mounted upon the upper end of the standard. This motor may receive current from a suitable source through a cable 15 to one end of which is attached a switch arm 16. This arm carries a contact 17 which is adapted to engage a stationary contact 18. The arm is pivotally mounted as shown at 19 and a spring 20 serves to normally disengage the contacts 17 and 18 so that when it is desired to operate the motor, the arm 16 must be pressed inwardly to complete the circuit.

Extending downwardly from the motor 14 is a shaft or spindle 21, and secured to the lower end of this shaft or spindle as shown at 22 is a driving member, shown in the drawings as a disk 23.

The spindle 21 extends through a hollow shaft 24 which is mounted for rotation in a bearing provided in the arm 12 and this hollow shaft has secured upon its upper end a beveled pinion 25 which engages a beveled pinion 26 carried at the inner end of a horizontally disposed shaft 27. The lower end of the hollow shaft 24 is recessed as shown at 28 and carries at its lower end a disk 29. This disk is opposed to the disk 23 but is held in close spaced relation through the engagement of the gear 25 with a flange 30 extending upwardly from the arm 12. Any other means may be provided which will hold the driving member or disk 23 from the driven member or disk 29. An opening 31 is provided in the lower end of the hollow shaft 24 so as to admit liquid to the space between the disks 23 and 29.

The shaft 27 operates in anti-friction bearings 32 and 33 carried by the standard 10 and the arm 13 respectively, and secured to the outer end of this arm is a dial 34 which is graduated as shown at 35 to represent seconds viscosity. Secured to the shaft 27 is an indicator 36 which is movable around the dial and while the latter is divided into graduations which may be of increasing value from zero, these divisions may represent any determined units of measure, or additional graduations may be provided for that purpose.

Secured upon the outer end of the shaft 27 is a grooved pulley 37 and attached to this pulley is one end of a flexible member 38 to which is attached a weight 39.

Removably and adjustably secured to the standard 10 is a holder 40 and for this purpose the holder includes a plate 41 which is provided with offset lugs 42 which extend into a slot 43, provided in the standard 10. Also extending through this slot is a threaded pin 44 which has mounted thereon a thumb nut 45, the latter acting to bind the holder in adjusted position. A cup or other like container 46 is retained within the holder by means of spring clips 47 which extend from the plate 41 so that the cup or container may be removably mounted. In addition, the holder 40 accommodates an electric or other heating unit 48, by means of which the contents of the container may be heated. A thermometer 49 is removably mounted in the arm 12 and extends downwardly into the container, as do also the driving and driven members 23 and 29 respectively.

A sample of the oil or other liquid to be tested is placed within the container 46 and the latter positioned so that the members 23 and 29 will be immersed in the oil, oil entering the recess 29 through the opening 31 so as to be distributed over the opposed faces of the disks 23 and 29. Operation of the motor will rotate the disk 23, and the latter will be coupled to the disk 29 by the film of oil between the disks. By feeding the oil to the disks from the recess 28, the oil is thrown centrifugally outward so as to maintain a constant film between the disks. Rotation of the driven disk 29 will be retarded through the weight 39. The heating unit 48 will heat the contents of the container, and as the opposed surfaces of the disks 23 and 29 represent the opposed surfaces of two relatively movable members, the oil will be subjected to the same action as though it were in actual use. As the disks 23 and 29 are held in close spaced relation, the coupling effect of the oil will decrease as operation continues and the heat of the oil is increased. Thus the indicator 36 will show the viscous characteristics of the oil as operation continues, and this may be easily read upon the dial, and when taken in connection with the thermometer 49 will accurately register the viscosity or surface tension at any degree Fahrenheit.

The invention is susceptible of various changes in its form, proportions and minor details of construction and the right is herein reserved to make such changes as properly fall within the scope of the appended claim.

Having described the invention what is claimed is:—

In a device for testing liquids, a frame, a liquid container removably supported thereby, means to heat the liquid within the container, a driving disk operating within the container, means to operate the driving disk, a tubular driven member including a disk arranged adjacent to and spaced from the driving disk and having a liquid reservoir communicative with said container and said driving disk to admit liquid between the disks and provide a coupling to operate the driven member, means to retard operation of the driven member, and an indicator operated by the driven member, the distance between the disks remaining fixed while the latter are rotating.

MARION B. WHEELER.